(12) United States Patent
Tan et al.

(10) Patent No.: US 12,392,319 B2
(45) Date of Patent: Aug. 19, 2025

(54) MODULAR WIND TURBINE BLADE STRUCTURE AND MANUFACTURING METHOD THEREOF

(71) Applicant: NEWTECH GROUP CO., LTD., Changzhou (CN)

(72) Inventors: Kunlun Tan, Changzhou (CN); Yelin Liu, Changzhou (CN); Qiuping Du, Changzhou (CN); Ning Li, Changzhou (CN); Lei Cao, Changzhou (CN); Jian Zhang, Changzhou (CN)

(73) Assignee: NEWTECH GROUP CO., LTD., Jiangsu (CN)

( * ) Notice: Subject to any disclaimer, the term of this patent is extended or adjusted under 35 U.S.C. 154(b) by 0 days.

(21) Appl. No.: 18/827,636

(22) Filed: Sep. 6, 2024

(65) Prior Publication Data

US 2024/0426274 A1    Dec. 26, 2024

Related U.S. Application Data

(63) Continuation of application No. PCT/CN2023/124319, filed on Oct. 12, 2023.

(30) Foreign Application Priority Data

Feb. 1, 2023    (CN) .......................... 202310050523.6

(51) Int. Cl.
    *F03D 1/06*    (2006.01)
(52) U.S. Cl.
    CPC ........ *F03D 1/069* (2023.08); *F05B 2240/304* (2020.08)

(58) Field of Classification Search
    CPC ...... F03D 1/0675; F03D 1/0688; F03D 1/069; F05B 2240/303; F05B 2240/304
    See application file for complete search history.

(56) References Cited

U.S. PATENT DOCUMENTS 5,165,859 A  * 11/1992  Monroe ................ F04D 29/289
                                                      416/224
8,192,169 B2 *  6/2012  Piasecki ................... F03D 9/00
                                                     29/889.71

(Continued)

FOREIGN PATENT DOCUMENTS

CN    102092134 A    6/2011
CN    115355133 A    11/2022

(Continued)

*Primary Examiner* — Sang K Kim
(74) *Attorney, Agent, or Firm* — SZDC Law PC

(57) ABSTRACT

A modular wind power blade structure and a manufacturing method thereof are disclosed. The structure includes a windward shell, a leeward shell, a T-shaped rib and a support member. The windward shell and leeward shell are assembled relative to each other to form a complete cross-sectional structure of the blade, the T-shaped rib is fixed on the windward shell and leeward shell along length direction of the blade and a plurality of the T-shaped ribs is provided at an interval in width direction of the blade, and the support member comprises a web and spar caps connected at both ends of the web, the two spar caps respectively fixedly connected to the inner wall of the windward shell and the leeward shell, and the T-shaped rib and the spar cap are pultruded profiles, and the windward shell and the leeward shell are formed through an automatic tape laying process.

5 Claims, 5 Drawing Sheets

(56) References Cited

U.S. PATENT DOCUMENTS

| | | | | |
|---|---|---|---|---|
| 11,486,348 B2 * | 11/2022 | Roberts | .................. | B29C 70/42 |
| 11,939,948 B2 * | 3/2024 | Mukherjee | ............ | F03D 1/0675 |
| 2007/0036659 A1 * | 2/2007 | Hibbard | ................ | B29C 66/303 |
| | | | | 416/233 |
| 2009/0140527 A1 * | 6/2009 | Pawar | .................. | F03D 1/0675 |
| | | | | 290/55 |
| 2014/0119932 A1 * | 5/2014 | Bell | ...................... | F03D 1/0675 |
| | | | | 29/889.71 |
| 2017/0058866 A1 * | 3/2017 | Caruso | .................. | F03D 1/0675 |
| 2020/0318605 A1 * | 10/2020 | Burchardt | ............ | F03D 1/0675 |

FOREIGN PATENT DOCUMENTS

| | | | | |
|---|---|---|---|---|
| CN | 115573854 A | | 1/2023 | |
| CN | 115596604 A | | 1/2023 | |
| CN | 115822867 A | | 3/2023 | |
| FI | 20206218 A1 * | | 5/2022 | ............. F03D 3/062 |

* cited by examiner

MODULAR WIND TURBINE BLADE STRUCTURE AND MANUFACTURING METHOD THEREOF

This application is a Continuation Application of PCT/CN2023/124319, filed on Oct. 12, 2023, which claims priority to Chinese Patent Application No. 202310050523.6, filed on Feb. 1, 2023, which is incorporated by reference for all purposes as if fully set forth herein.

TECHNICAL FIELD

The present invention relates to the technical field of wind power blades, in particular to a modular wind power blade structure and a manufacturing method thereof.

BACKGROUND

Wind power blades are gradually developing towards the direction of large-scale and segmentation. In the prior art, how to improve the installation structural strength of modular wind power blades has become an urgent problem to be solved at present.

In the prior art, in order to improve the structural strength of modular wind turbine blades, for example, the Chinese utility model patent CN216767624U discloses a connection structure of large-scale wind turbine blade on Jun. 17, 2022. In order to increase the size of the blade in the width direction, the middle portion is provided with a sandwich structure with an inner core and a reinforcement layer to improve the structural strength of the product.

However, when implementing the above scheme, the inventor found that the production and connection of the wind turbine blade shell with such sandwich structure were relatively complicated, which greatly reduced the processing efficiency of the blades, and the structural strength of the module connections could not be guaranteed.

SUMMARY

In view of at least one of the above technical problems, the present invention provides a modular wind power blade structure and a manufacturing method thereof, which improve the structural strength and processing efficiency of the modular wind power blades through improvements in the structure and manufacturing method.

According to the first aspect of the invention, a modular wind turbine blade structure is provided, comprising a windward shell, a leeward shell, a T-shaped rib and a support member, wherein the windward shell and the leeward shell are assembled relative to each other to form a complete cross-sectional structure of the blade, wherein the T-shaped rib is fixed on the windward shell and the leeward shell along length direction of the blade and a plurality of the T-shaped ribs is provided at an interval in width direction of the blade, and wherein the support member comprises a web and spar caps connected at both ends of the web, the two spar caps respectively fixedly connected to the inner wall of the windward shell and the leeward shell.

The T-shaped rib and the spar cap are pultruded profiles, and the windward shell and the leeward shell are formed through an automatic tape laying process.

In some embodiments of the present invention, the structure further comprises a trailing edge beam disposed at a position where the windward shell and the leeward shell are butted, wherein the top surface of the trailing edge beam is attached to the windward shell at the trailing edge, and the bottom surface of the trailing edge beam is attached to the leeward shell at the trailing edge.

In some embodiments of the present invention, the windward shell and the leeward shell are bent inward at the trailing edge, and are attached to the sidewall of the trailing edge beam.

In some embodiments of the present invention, the trailing edge beam comprises a U-shaped beam and a sealing plate connected to the opening of the U-shaped beam.

In some embodiments of the present invention, both the windward shell and the leeward shell have an inwardly bent flanging structure at the leading edge, and the flanging structures of the windward shell and the leeward shell are arranged parallel and opposite, with a structural adhesive layer between them.

In some embodiments of the present invention, the flanging structures are covered with an inner reinforcement layer at their connection inside the shell, and the flanging structures are covered with an outer reinforcement layer externally.

In some embodiments of the invention, the structural adhesive layer overflows at both ends of the two flanging structures to form an undercut structure that is covered by the inner reinforcement layer and the outer reinforcement layer respectively, both ends of the inner reinforcement layer and the outer reinforcement layer are fixedly connected to the windward shell and the leeward shell respectively.

In some embodiments of the present invention, the T-shaped rib comprises a bottom plate and a vertical plate vertically connected on the center line of the bottom plate, wherein the bottom plate is fixedly connected to the inner wall of the windward shell or the leeward shell, and wherein portions of the bottom plate on both sides of the vertical plate are also covered with a reinforcement layer.

In some embodiments of the present invention, the tape laying material of the windward shell and the leeward shell is a multilayer biaxial fiberglass cloth, and the web is formed of fiberglass cloth sandwiching PET foam.

According to a second aspect of the present invention, a method for manufacturing modular wind turbine blade is also provided, comprising the following steps:

- performing automated tape laying in a wind turbine blade mold to form a windward shell and a leeward shell, wherein the windward shell and the leeward shell form a complete cross section of the blade;
- laying T-shaped ribs at preset positions on the inner wall of the windward shell and the leeward shell;
- laying a support member and a trailing edge beam on one of the windward shell and the leeward shell;
- laying a reinforcement layer covering a portion of flank of the T-shaped rib on the windward shell and the leeward shell;
- performing vacuum infusion molding on the laid windward shell and the leeward shell as a whole respectively; and
- after molding and demoulding, assembling the windward shell and the leeward shell as a whole, wherein the windward shell and the leeward shell are connected at the trailing edge by a trailing edge beam, and bonded at the leading edge by a flanging structure, with the bonding at the leading edge being reinforced by an inner reinforcement layer and an outer reinforcement layer. Compared with the sandwich wind turbine blade shell structure in the prior art, the present invention has the advantages of higher processing efficiency and better structural strength by preparing the windward shell and the leeward shell using the automated tape laying process, and improved manufacturing efficiency and quality by using pultruded profiles for the T-shaped ribs and the spar caps in the support member.

DESCRIPTION OF THE DRAWINGS

In order to more clearly illustrate the embodiments of the present invention or the technical solutions in the prior art, the accompanying drawings to be used in the description of the embodiments or prior art will be briefly described below. It is obvious that the accompanying drawings in the following description are only some of the embodiments recorded in the present invention, and other accompanying drawings can be obtained according to these accompanying drawings without creative work for those of ordinary skill in the art.

DESCRIPTION OF THE EMBODIMENTS

The technical solutions in the embodiments of the present invention will be described clearly and completely in conjunction with the accompanying drawings in the embodiments of the present invention. Obviously, the described embodiments are only a portion of the embodiments of the present invention, rather than all the embodiments.

It should be noted that when an element is referred to as being "fixed to" another element, it can be directly on the another element or an intermediate element may also be present. It should be noted that when an element is referred to as being "connected to" another element, it can be directly on the another element or an intermediate element may also be present. The terms "vertical", "horizontal", "left", "right" and similar expressions used herein are for illustrative purposes only and do not mean that they are the only mode of implementation.

Unless otherwise defined, all technical and scientific terms used herein have the same meaning as commonly understood by those skilled in the art of the present invention. The terms used herein are for the purpose of describing specific embodiments only and are not intended to limit the invention. The term "and/or" as used herein includes any and all combinations of one or more of the related listed items.

Figure 1:
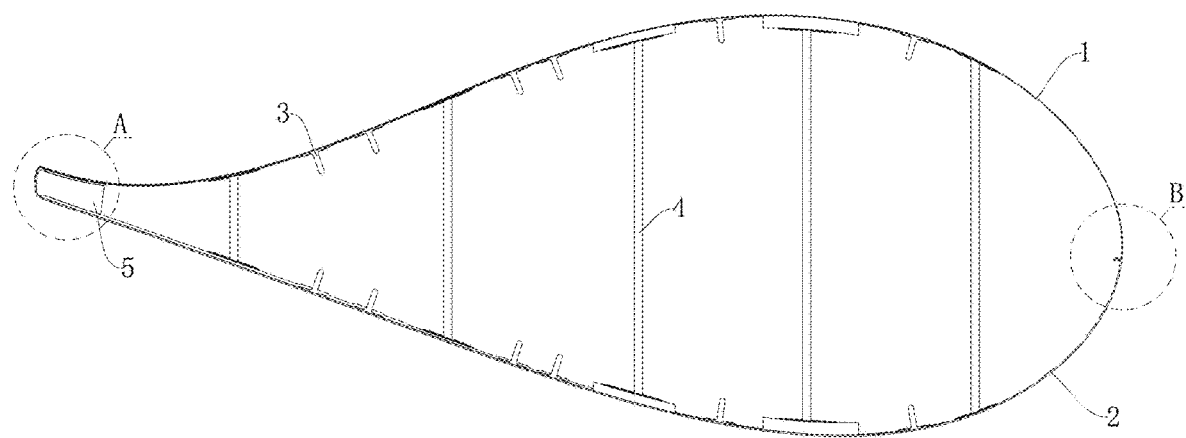
FIG. 1 is a schematic diagram of the cross-sectional structure of the modular wind turbine blade structure according to an embodiment of the present invention.
Figure 2:
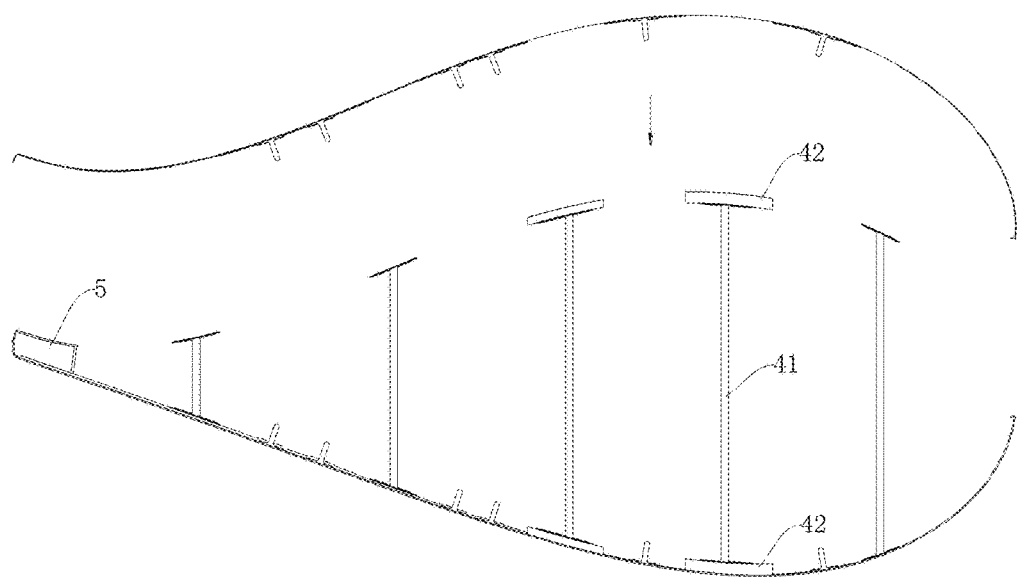
FIG. 2 is a schematic structural diagram of the installation structure of the modular wind turbine blade structure according to an embodiment of the present invention.
Figure 3:
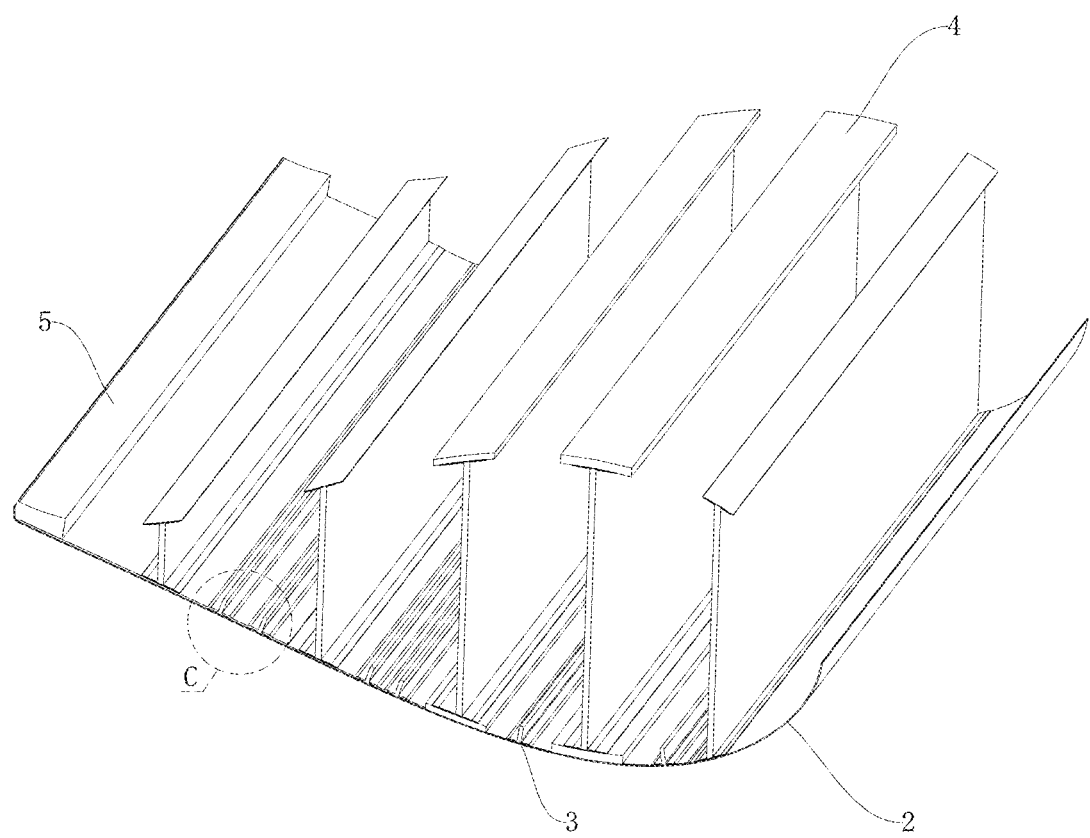
FIG. 3 is a schematic diagram of the structure of installing T-shaped ribs and support members on the leeward shell according to an embodiment of the present invention.

The modular wind turbine blade structure shown in FIGS. 1 to 7 comprises a windward shell 1, a leeward shell 2, a T-shaped rib 3 and a support member 4. The windward side shell 1 and the leeward side shell 2 are assembled relative to each other to form a complete cross-sectional structure of the blade. It should be pointed out here that in the embodiments of the present invention, the blade is divided into a blade root module, a blade stem module, and a blade tip module along the length direction. The cross-sectional structure of the blade formed by the relative assembly of the windward shell 1 and the leeward shell 2 is a closed shape of the blade root, blade body or blade tip. The T-shaped rib 3 is fixed on the windward shell 1 and the leeward shell 2 along the length direction of the blade and a plurality of the T-shaped ribs 3 is provided at an interval in width direction of the blade. As shown in FIGS. 1 and 2, the T-shaped ribs 3 are attached to the inner wall of the windward shell 1 and the leeward shell 2 and extend along the length direction of the blade. With such arrangement, the efficiency can be further improved. The support member 4 comprises a web 41 and spar caps 42 connected at both ends of the web 41, the two spar caps fixedly connected to inner wall of the windward shell 1 and the leeward shell 2 respectively. It should also be pointed out here that in the embodiments of the present invention, different numbers of support members 4 and T-shaped ribs 3 are provided according to the different widths of the blade root, blade stem and blade tip. In some embodiments of the present invention, the blade tip adopts a structure of two support members 4 and one T-shaped rib 3, the blade stem adopts a structure of five support members 4 and six T-shaped ribs 3, and the blade root adopts a structure of five support members 4 and six T-shaped ribs 3. The specific number of the T-shaped ribs 3 and the support members 4 required to meet the structural strength can be determined from simulation.

In particular, in the embodiments of the present invention, the T-shaped rib 3 and the spar cap 42 are pultruded profiles, and the windward shell 1 and the leeward shell 2 are formed through an automatic tape laying process. During processing, an automated tape laying machine is used to perform tape laying in a mold of the windward shell 1 and a mold of the leeward shell 2. By laying in this form, on the one hand, the sandwich structure in the prior art is canceled, and on the other hand, the structural strength can be guaranteed by the automatic processing of the tape laying machine. The T-shaped rib 3 and the spar cap 42 are processed in the form of pultrusion, which also improves the processing efficiency.

Compared with the sandwich structure in the prior art, the above embodiments offer higher processing efficiency and better structural strength by preparing the windward shell and the leeward shell using the automated tape laying process, and improved manufacturing efficiency and quality by using pultruded profiles for the T-shaped ribs 3 and the spar caps 42 in the support member 4. During processing, all structural parts and layers are prefabricated, which improves the production efficiency. Through modular manufacturing, the manufacturing cycle is shortened. In the embodiments of the present invention, the shell is made of carbon fiber reinforced matrix composite material or fiber reinforced composite material, realizing simplified quality control of the manufacturing process, reduced manufacturing cost, good structural stability, and higher strength.

Figure 4:
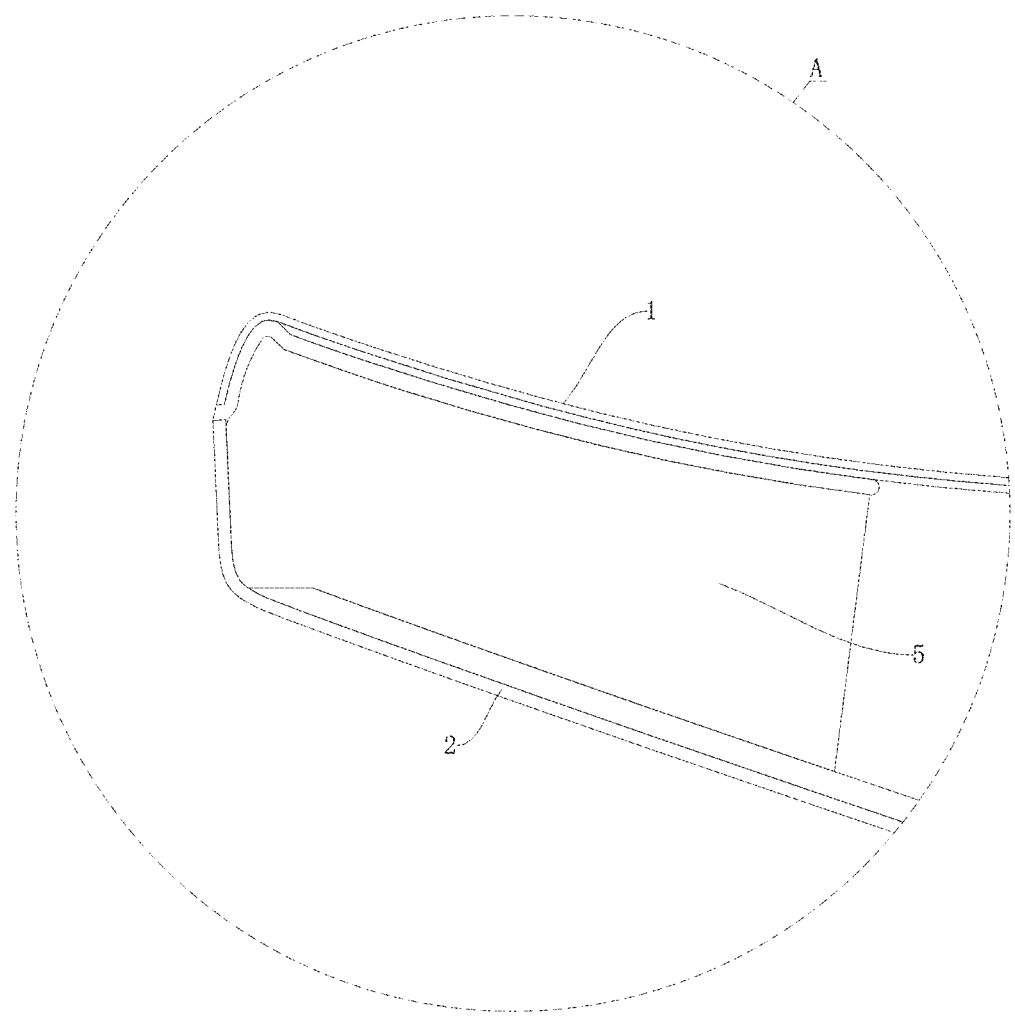
FIG. 4 is a partially enlarged view at point A in FIG. 1 according to an embodiment of the present invention.

As shown in FIGS. 1 to 4, in the embodiments of the present invention, in order to improve the connection strength between the leeward shell 2 and the windward shell 1 and enhance the load-bearing capacity of the wind turbine blade in the flapping direction, the structure further comprises a trailing edge beam 5 disposed at a position where the windward shell 1 and the leeward shell 2 are butted. The top surface of the trailing edge beam 5 is attached to the windward shell 1 at the trailing edge, and the bottom surface of the trailing edge beam 5 is attached to the leeward shell 2 at the trailing edge. Further, as shown in FIG. 4, the windward shell 1 and the leeward shell 2 are bent inward at the trailing edge, and are attached to the sidewall of the trailing edge beam 5. In this way, the upper, lower, and outer surfaces of the trailing edge beam 5 are connected to the windward shell 1 or the leeward shell 2, thereby strengthening the support and improving the connection strength.

Figure 5:
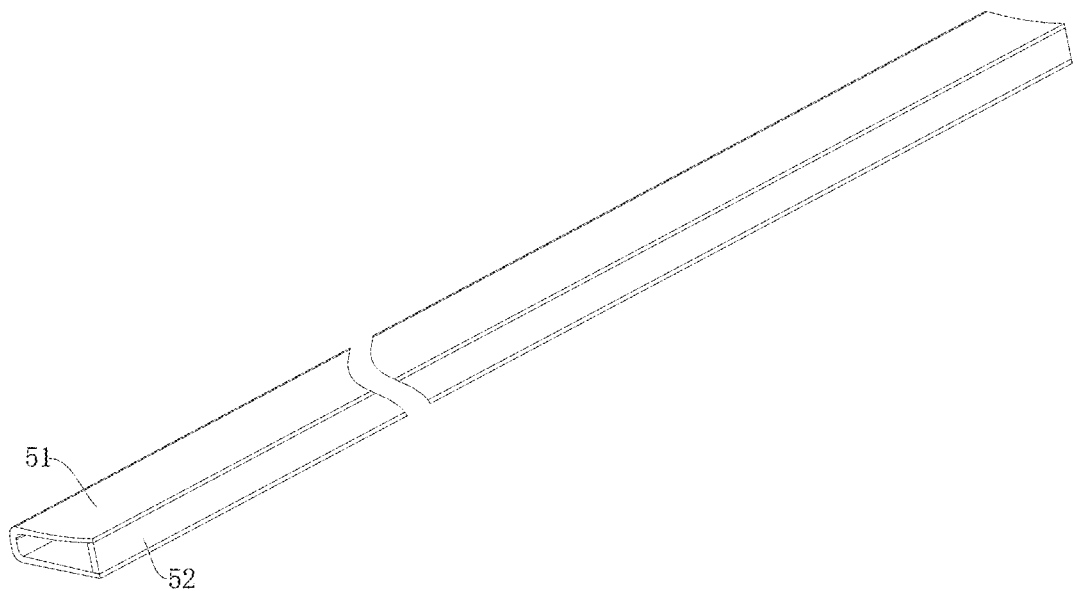
FIG. 5 is a schematic diagram of the structure of the trailing edge beam according to an embodiment of the present invention.

For the convenience of processing the trailing edge beam 5, as shown in FIG. 5, the trailing edge beam 5 comprises a U-shaped beam 51 and a sealing plate 52 connected to the opening of the U-shaped beam 51. With the provision of the U-shaped beam 51, it is convenient for the sidewall of the U-shaped beam 51 to follow the shape of the windward shell 1 or the leeward shell 2, thereby achieving closer contact and improving the connection effect.

Figure 6:
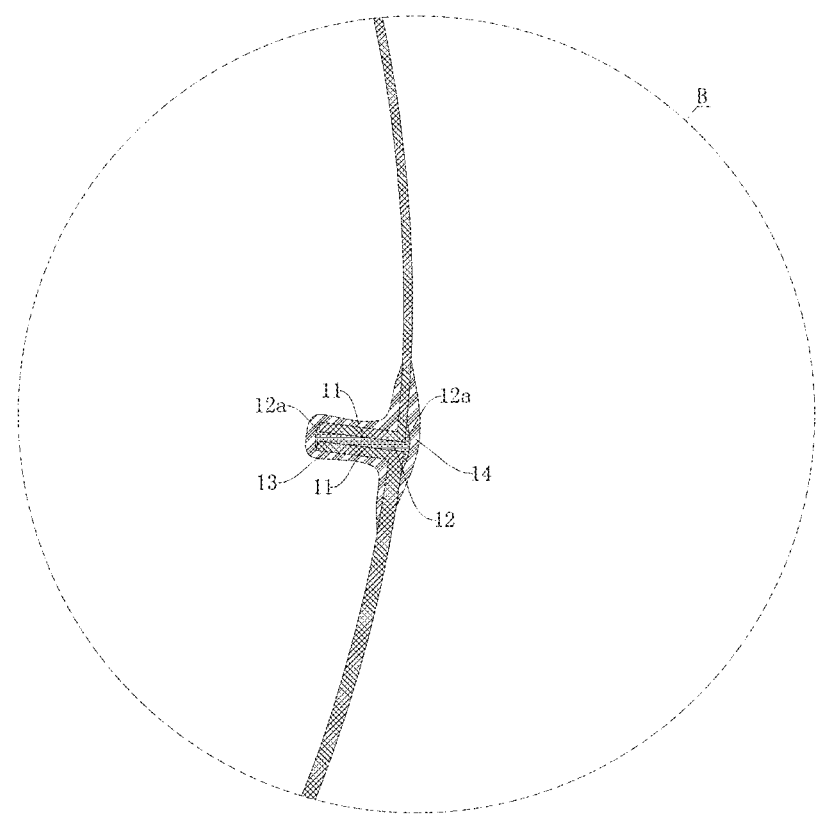
FIG. 6 is a partially enlarged view at point B in FIG. 1 according to an embodiment of the present invention.

In the embodiments of the present invention, in order to improve the connection strength of the shell at the leading edge, as shown in FIG. 6, both the windward shell 1 and the leeward shell 2 have an inwardly bent flanging structure 11 at leading edge, and the flanging structure 11 of the windward shell 1 and the flanging structure 11 of the leeward shell 2 are arranged parallel and opposite, with a structural adhesive layer 12 between them. With the provision of the flanging structure 11, the connection area between the windward shell 1 and the leeward shell 2 at the leading edge is increased, and the inward bending does not affect the shape of the blade. Through the above structural arrangement, the bonding area is increased, thereby enhancing the strength of the connection structure.

Continued reference is made to FIG. 6. In the embodiments of the present invention, in order to further improve the strength of the connection structure between the windward shell 1 and the leeward shell 2 at the leading edge position, the flanging structures 11 are covered with an inner reinforcement layer 13 at their connection inside the shell, and the flanging structures 11 are covered with an outer reinforcement layer 14 externally. With the provision of the inner reinforcement layer and the outer reinforcement layer, the connection reliability of the flanging structures 11 can be improved and the possibility of cracking can be reduced.

In the embodiment of the present invention, in order to further improve the connection reliability of the inner reinforcement layer 13 and the outer reinforcement layer 14, as shown in FIG. 6, the structural adhesive layer 12 overflows at both ends of the two flanging structures 11 to form an undercut structure 12a that is covered by the inner reinforcement layer 13 and the outer reinforcement layer 14 respectively, both ends of the inner reinforcement layer 13 and the outer reinforcement layer 14 are fixedly connected to the windward shell 1 and the leeward shell 2 respectively. With such structural arrangement, a cap structure is formed at both ends of the structural adhesive layer 12, which not only increases the bonding stability of the two flanging structures 11, but also improves the bonding strength of the inner reinforcement layer and the outer reinforcement layer.

Figure 7:
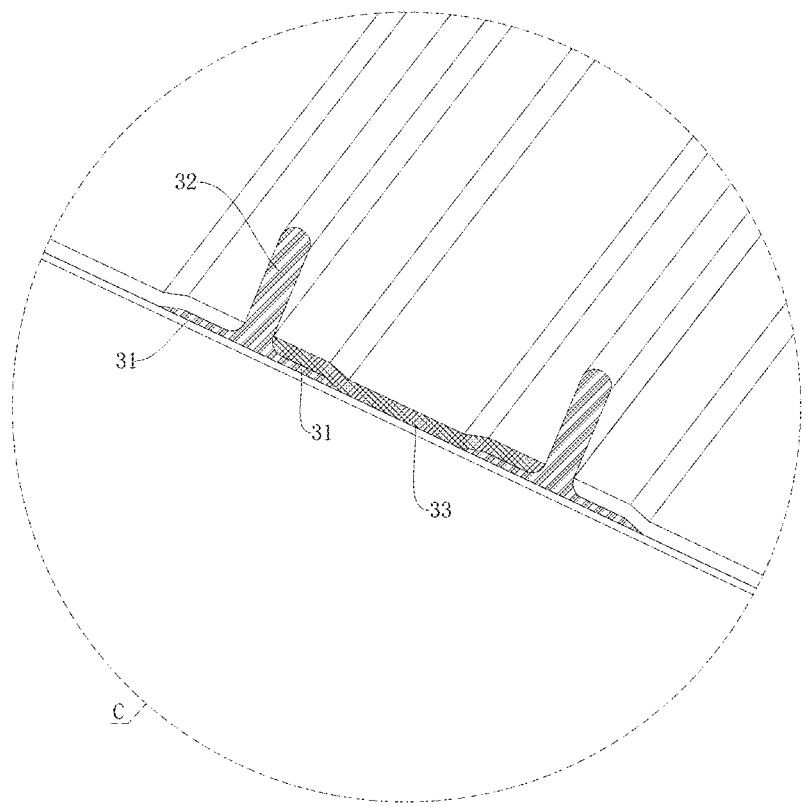
FIG. 7 is a partially enlarged view at point B in FIG. 3 according to an embodiment of the present invention.
Figure 8:
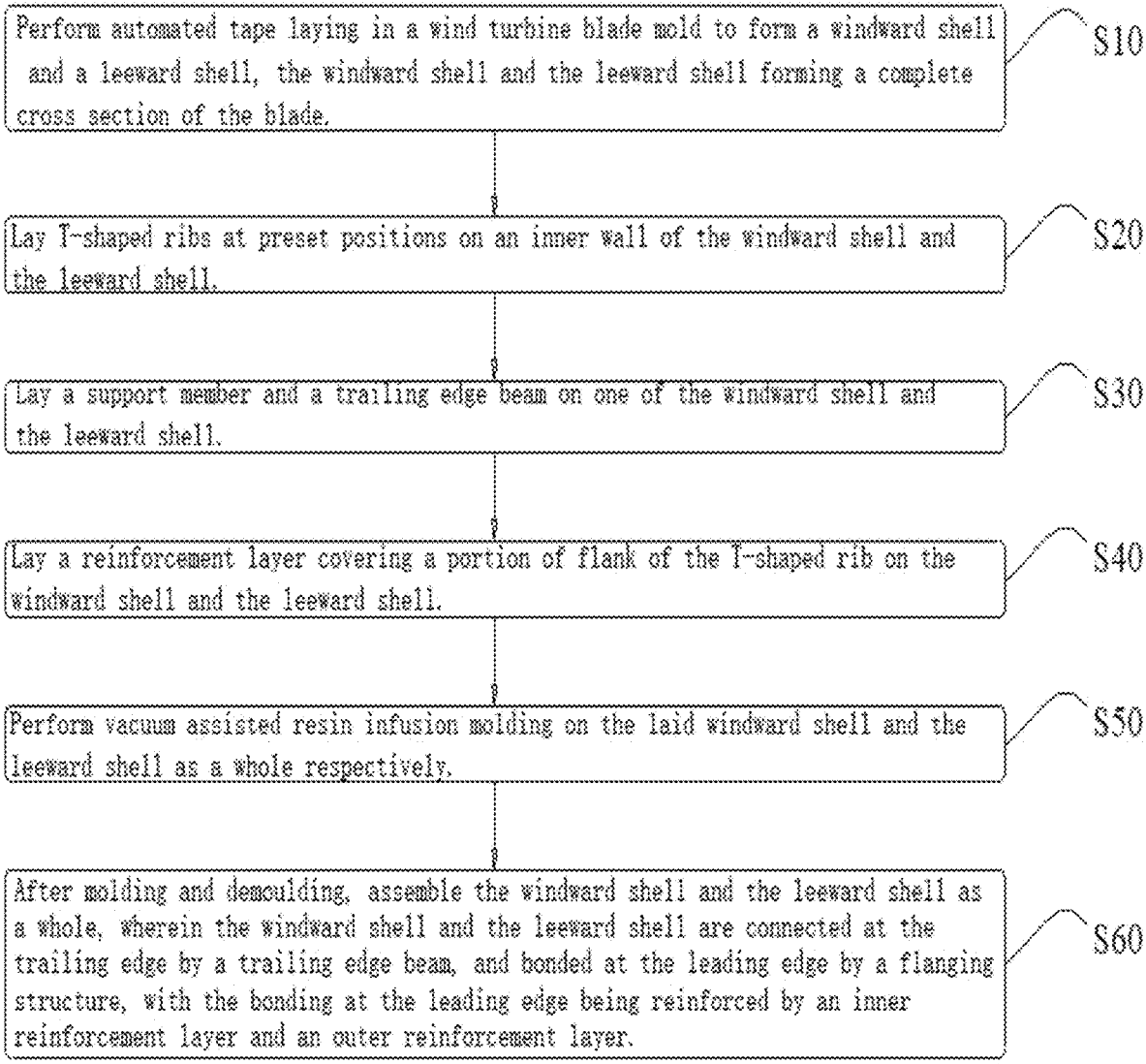
FIG. 8 is a flowchart of steps of a method for manufacturing modular wind turbine blades according to an embodiment of the present invention.

In the embodiments of the present invention, the specific structure of T-shaped rib 3 is shown in FIG. 7. The T-shaped rib 3 comprises a bottom plate 31 and a vertical plate 32 vertically connected on the center line of the bottom plate 31. The bottom plate 31 is fixedly connected to the inner wall of the windward shell 1 or the leeward shell 2, and portions of the bottom plate 31 on both sides of the vertical plate 32 are also covered with a reinforcement layer. During the connection process, the bottom plate 31 of the T-shaped rib 3 is first attached to the windward shell 1 and the leeward shell 2 by laser positioning, and then the reinforcement layer 33 is laid. As shown in FIG. 7, when the reinforcement layer 33 is laid, both sides of the reinforcement layer 33 are lapped on the bottom plate 31 of the T-shaped rib 3, and then a vacuum bag is laid to perform vacuum assisted resin infusion molding, whereby the shell is solidified and formed. In addition, it should be noted here that in some embodiments of the present invention, the tape laying material of the windward shell 1 and leeward 2 is a multilayer biaxial fiberglass cloth, and the web 41 is formed of fiberglass cloth sandwiching PET foam.

In the embodiments of the present invention, a method for manufacturing modular wind turbine blade is also provided, comprising the following steps.

At S10, automated tape laying is performed in a wind turbine blade mold to form a windward shell 1 and a leeward shell 2, wherein the windward shell 1 and the leeward shell 2 form a complete cross section of the blade. Specifically, the laying operation is performed on the molds of the windward shell 1 and the leeward shell 2 by an automated tape laying machine. In the embodiments of the invention, the sandwich structure in the prior art is replaced by the automated tape laying machine, greatly improving the processing efficiency and structural strength of the shell.

At S20, T-shaped ribs 3 are laid at preset positions on the inner wall of the windward shell 1 and the leeward shell 2. The laying operation is assisted by laser positioning to ensure the accuracy of laying. Specifically, specific areas where T-rib 3 or spar cap 42 need to be laid are projected on the inner wall of the windward shell 1 and the leeward shell 2 by laser light, and then the T-rib 3 is fixed in the laser projection area. In addition, it should be noted here that in some embodiments of the present invention, in order to further improve the positioning accuracy, the spar cap 42 is also provided with a groove structure for bonding the two webs 41.

At S30, a support member 4 and a trailing edge beam 5 are laid on one of the windward shell 1 and the leeward shell 2. Specifically, the trailing edge beam 5 may be bonded to the windward shell 1 or the leeward shell 2, which can be selected by those skilled in the art according to needs.

At S40, a reinforcement layer 33 covering a portion of flank of the T-shaped rib 3 on the windward shell 1 and the leeward shell 2 is laid. As shown in FIG. 7, when the reinforcement layer 33 is laid, both sides of the reinforcement layer 33 need to be lapped on the bottom plate 31 of the T-shaped rib 3 and abutted against the bottom of the vertical plate 32 of the T-shaped rib 3.

At S50, vacuum assisted resin infusion molding is performed on the laid windward shell 1 and the leeward shell 2 as a whole respectively. The vacuum assisted resin infusion includes sleeving a vacuum bag following the shape of the shell on the shell, vacuumizing the bag while infusing the resin so that the resin penetrates into every corner, followed by solidification and drying. In this way, the bonding strength and the overall structural strength of the shell are improved.

At S60, after molding and demoulding, the windward shell and the leeward shell are assembled as a whole. The windward shell 1 and the leeward shell 2 are connected at the trailing edge by a trailing edge beam 5, and bonded at the leading edge by a flanging structure 11, with the bonding at the leading edge being reinforced by an inner reinforcement layer 13 and an outer reinforcement layer 14. After the connection is completed, the leading and trailing edges are trimmed, puttyed, sanded, and painted, followed by waiting for transfer.

Those skilled in the industry should understand that the present invention is not limited by the foregoing embodiments. The foregoing embodiments and descriptions only illustrate the principles of the present invention. Without departing from the spirit and scope of the present invention, the present invention will have various changes and improvements, which fall within the scope of the claimed invention. The scope of protection claimed by the present invention is defined by the appended claims and their equivalents.

The invention claimed is:

1. A modular wind turbine blade structure, wherein the blade is divided into a blade root module, a blade stem module and a blade tip module in the length direction thereof, the structure comprising a windward shell, a leeward shell, a T-shaped rib and a support member, wherein the windward shell and the leeward shell are assembled relative to each other to form a complete cross-sectional structure of the blade, wherein the T-shaped rib is fixed on the windward shell and the leeward shell along length direction of the blade, a plurality of the T-shaped ribs is provided at an interval in width direction of the blade, and the T-shaped ribs are attached to the inner wall of the windward shell and the leeward shell, and wherein the support member comprises a web and spar caps connected at both ends of the web, the two spar caps respectively fixedly connected to the inner wall of the windward shell and the leeward shell, wherein the T-shaped rib and the spar cap are pultruded profiles, and the windward shell and the leeward shell are formed through an automatic tape laying process, wherein the structure further comprises a trailing edge beam disposed at a position where the windward shell and the leeward shell are butted, wherein the top surface of the trailing edge beam is attached to the windward shell at the trailing edge, and the bottom surface of the trailing edge beam is attached to the leeward shell at the trailing edge, and wherein the windward shell and the leeward shell are bent inward at the trailing edge and are attached to the sidewall of the trailing edge beam, wherein both the windward shell and the leeward shell have an inwardly bent flanging structure at the leading edge, and the flanging structures of the windward shell and the leeward shell are arranged parallel and opposite, with a structural adhesive layer between them, wherein the flanging structures are covered with an inner reinforcement layer at their connection inside the shell, and the flanging structures are covered with an outer reinforcement layer externally, and wherein the structural adhesive layer overflows at both ends of the two flanging structures to form an undercut structure that is covered by the inner reinforcement layer and the outer reinforcement layer respectively, both ends of the inner reinforcement layer and the outer reinforcement layer are fixedly connected to the windward shell and the leeward shell respectively.

2. The modular wind turbine blade structure according to claim 1, wherein the trailing edge beam comprises a U-shaped beam and a sealing plate connected to the opening of the U-shaped beam.

3. The modular wind turbine blade structure according to claim 1, wherein the T-shaped rib comprises a bottom plate and a vertical plate vertically connected on the center line of the bottom plate, wherein the bottom plate is fixedly connected to the inner wall of the windward shell or the leeward shell, and wherein portions of the bottom plate on both sides of the vertical plate are also covered with a reinforcement layer.

4. The modular wind turbine blade structure according to claim 1, wherein the tape laying material of the windward shell and the leeward shell is a multilayer biaxial fiberglass cloth, and the web is formed of fiberglass cloth sandwiching PET foam.

5. A method for manufacturing the modular wind turbine blade structure according to claim 1, comprising the following steps:

performing automated tape laying in a wind turbine blade mold to form a windward shell and a leeward shell, wherein the windward shell and the leeward shell form a complete cross section of the blade;

laying T-shaped ribs at preset positions on an inner wall of the windward shell and the leeward shell;

laying a support member and a trailing edge beam on one of the windward shell and the leeward shell;

laying a reinforcement layer covering a portion of flank of the T-shaped rib on the windward shell and the leeward shell;

performing vacuum infusion molding on the laid windward shell and the leeward shell as a whole respectively; and after molding and demoulding, assembling the windward shell and the leeward shell as a whole, wherein the windward shell and the leeward shell are connected at the trailing edge by a trailing edge beam, and bonded at the leading edge by a flanging structure, with the bonding at the leading edge being reinforced by an inner reinforcement layer and an outer reinforcement layer.

* * * * *